United States Patent
Poole

(10) Patent No.: US 10,696,349 B2
(45) Date of Patent: Jun. 30, 2020

(54) BICYCLE FRAME JOINTS WITH INTERNAL CABLING PASSAGES

(71) Applicant: Wayne Gerard Poole, Alexandria, VA (US)

(72) Inventor: Wayne Gerard Poole, Alexandria, VA (US)

( * ) Notice: Subject to any disclaimer, the term of this patent is extended or adjusted under 35 U.S.C. 154(b) by 30 days.

(21) Appl. No.: 16/350,391

(22) Filed: May 15, 2018

(65) Prior Publication Data
US 2020/0010140 A1    Jan. 9, 2020

Related U.S. Application Data

(60) Provisional application No. 62/603,027, filed on May 16, 2017.

(51) Int. Cl.
| | | |
|---|---|---|
| *B62K 19/18* | (2006.01) | |
| *B62K 19/32* | (2006.01) | |
| *B62K 19/16* | (2006.01) | |
| *B62K 19/34* | (2006.01) | |
| *B62K 19/36* | (2006.01) | |

(52) U.S. Cl.
CPC .............. *B62K 19/18* (2013.01); *B62K 19/16* (2013.01); *B62K 19/32* (2013.01); *B62K 19/34* (2013.01); *B62K 19/36* (2013.01)

(58) Field of Classification Search
CPC ................................. B62K 19/18; B62K 19/22
See application file for complete search history.

(56) References Cited

U.S. PATENT DOCUMENTS

| | | | | |
|---|---|---|---|---|
| 1,117,916 | A * | 11/1914 | Schmidt ................ | E04B 1/2604 403/174 |
| 4,479,662 | A * | 10/1984 | Defour ................... | B62K 19/22 280/281.1 |
| 4,583,755 | A * | 4/1986 | Diekman ............... | B62K 19/30 280/281.1 |
| 4,585,246 | A * | 4/1986 | Diekman ............... | B62K 19/30 280/281.1 |
| 4,721,407 | A * | 1/1988 | Liu ........................ | B62K 19/22 403/205 |
| 4,902,160 | A * | 2/1990 | Jeng ....................... | B62K 19/16 280/281.1 |
| 4,915,404 | A * | 4/1990 | Chonan .................. | B62K 19/30 280/288.3 |
| 4,917,397 | A * | 4/1990 | Chonan .................. | B62K 19/30 280/281.1 |
| 6,340,509 | B1 * | 1/2002 | Nelson ................... | B29C 33/40 428/34.7 |
| 7,114,738 | B1 * | 10/2006 | Chen ...................... | B62K 19/30 280/281.1 |

(Continued)

FOREIGN PATENT DOCUMENTS

DE     19904545 A1 *  8/2000  ............. B62K 19/18

*Primary Examiner* — Kevin Hurley

(57) ABSTRACT

A bicycle frame joint accommodating internal cabling is shown and described. The joint includes an internal passage joining at least two frame tube receiving sockets. The internal passage can receive cables and lighting strips, enabling a circuit or lighting strip to extend along a plurality of frame tubes, and to pass through joints between adjacent frame tubes, to promote circuit continuity. Some bicycle frame joints may have internal passages bypassing some sockets, enabling a continuous circuit to bypass an intervening frame tube.

20 Claims, 6 Drawing Sheets

(56) References Cited

U.S. PATENT DOCUMENTS

| | | | | |
|---|---|---|---|---|
| 8,448,971 B2* | 5/2013 | Giroux | ............ | B62H 5/006 |
| | | | | 280/287 |
| 9,403,572 B2* | 8/2016 | Jankura | ............ | B62K 3/02 |
| 2011/0115193 A1* | 5/2011 | Giroux | ............ | B62K 19/34 |
| | | | | 280/281.1 |

* cited by examiner

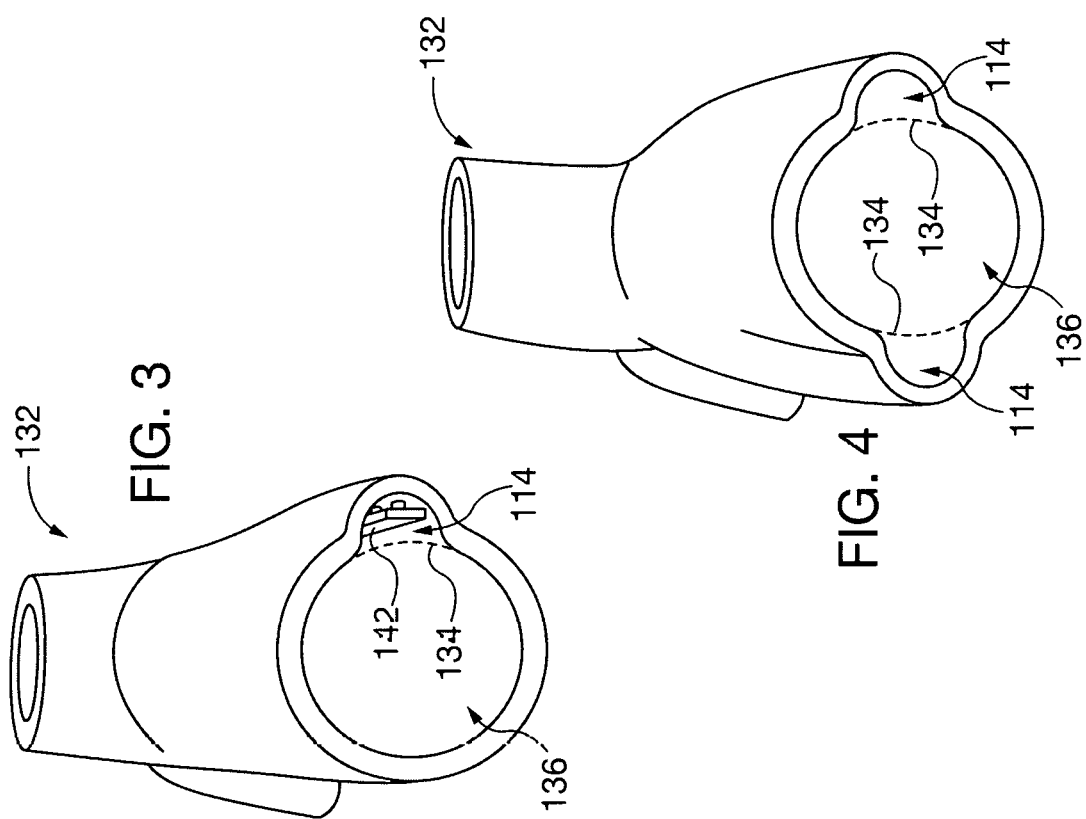
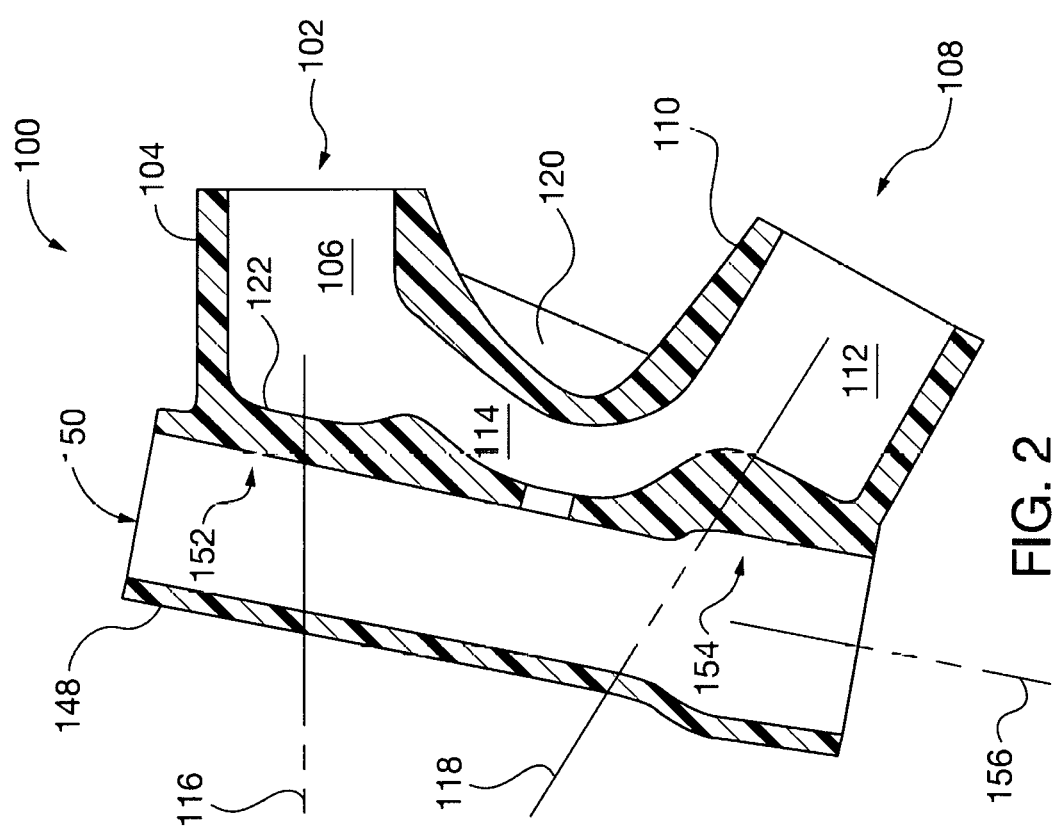

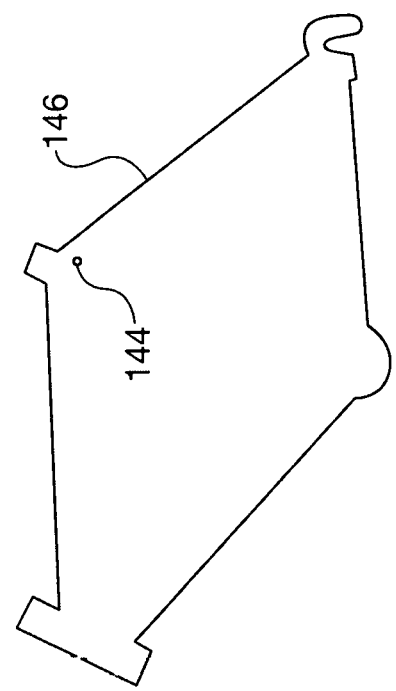
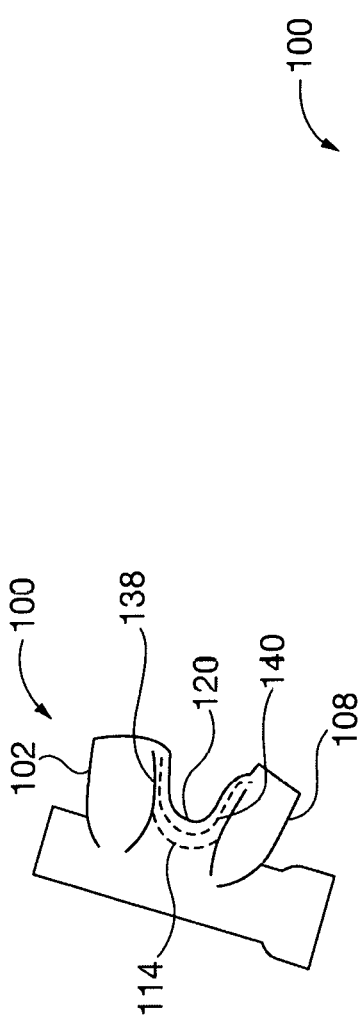
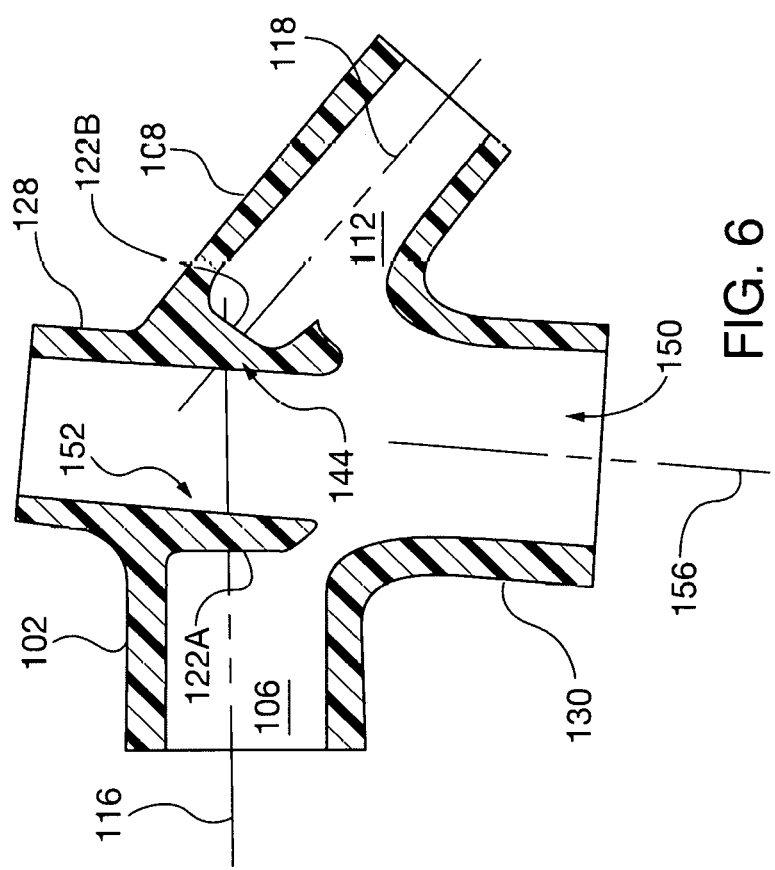
FIG. 5
FIG. 6
FIG. 7

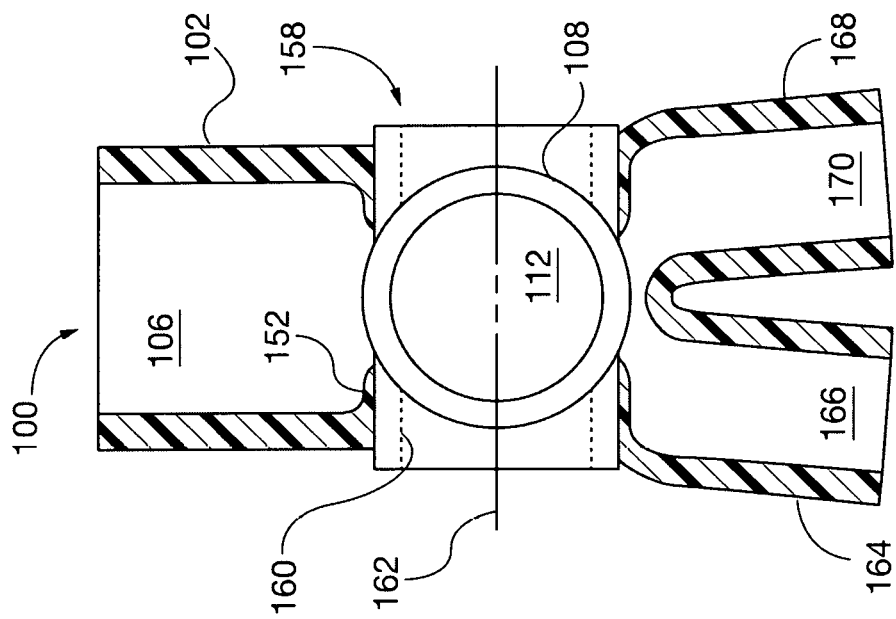
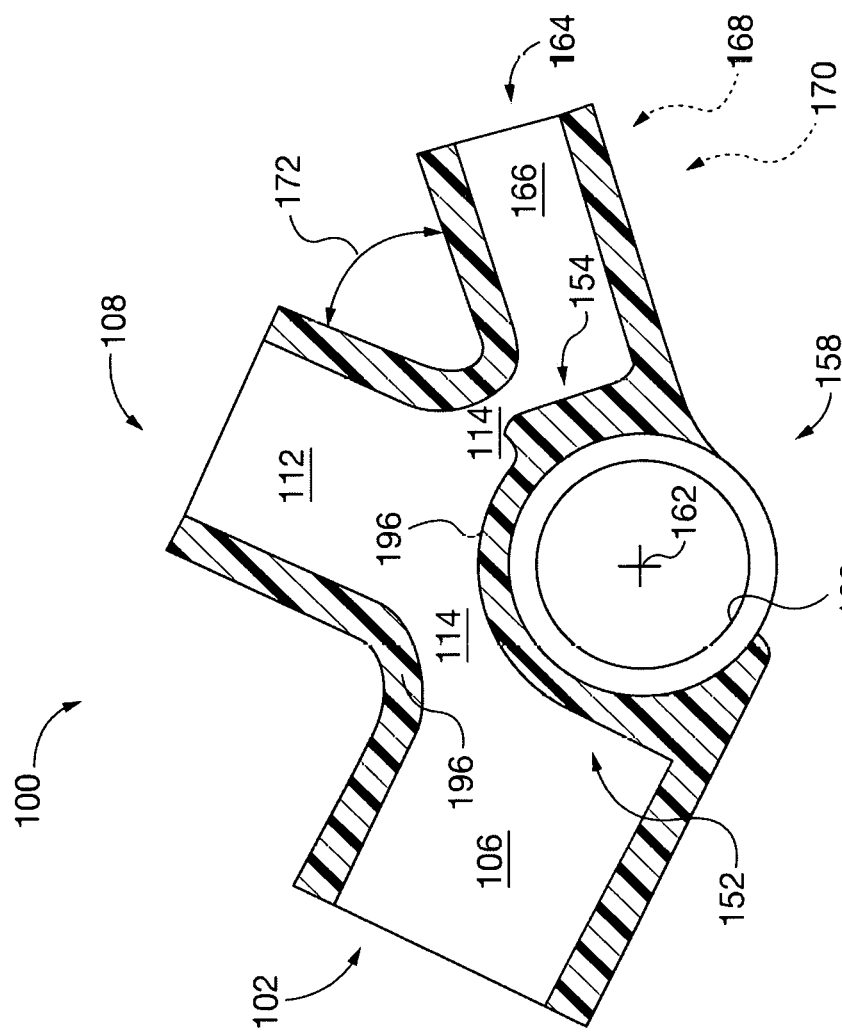

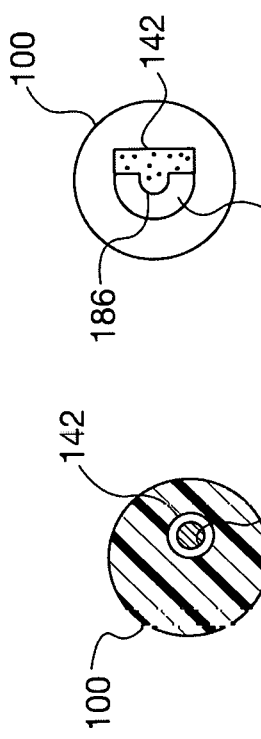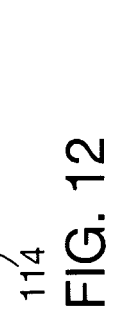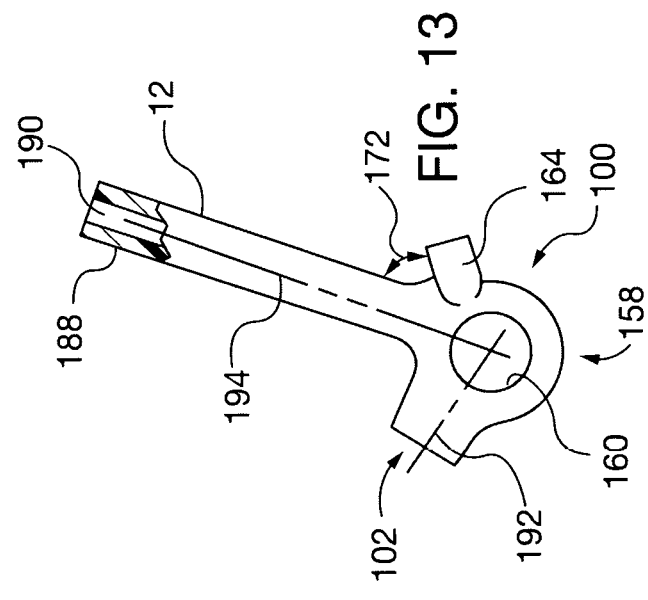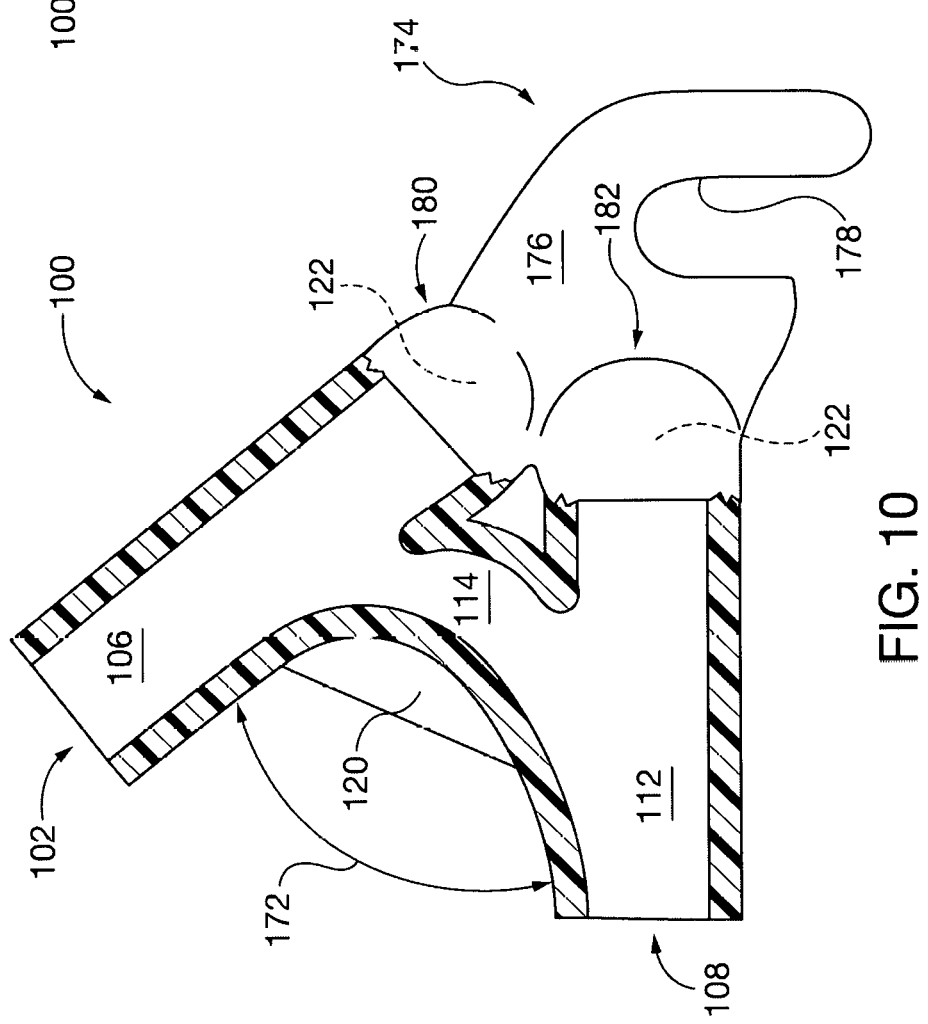

BICYCLE FRAME JOINTS WITH INTERNAL CABLING PASSAGES

REFERENCE TO RELATED APPLICATION

This application claims priority of Application No. 62/603,027, filed May 16, 2017.

FIELD OF THE INVENTION

The present invention relates to bicycle frames, and more particularly, to bicycles carrying cabling internally within frame members.

BACKGROUND OF THE INVENTION

A bicycle can be made with internal power and signaling cables, flexible lighting strips, and other flexible elongated members passing through hollow tubing of the frame of the bicycle. If continuity of the flexible elongated members is desired throughout more than one tube of the frame, accommodation must be made to conduct the flexible elongated members through joints of the frame where one tube intersects another tube at an oblique angle. One problem of routing cables through joints is potentially sharp bends which must be made in one or more cables. It may not be possible to feed a cable through the joint during assembly.

Alternatively, a cable such as a cable bearing illumination sources may not have sufficient flexibility to withstand severe bending, even if insertion of the cable can be performed.

There exists a need to make bicycle frames conducive to containing continuous or relatively long extents of elongated flexible members carried therein, and to overcome interferences and other potential problems which may occur in the absence of accommodation of elongated flexible members.

SUMMARY OF THE INVENTION

The present invention therefore proposes improved bicycle frame joints having auxiliary passages for conducting elongated flexible members through frame tubing at joints where frame tubes converge. These auxiliary passages allow for routing elongated flexible members such as cables through the joints while still accommodating full penetration of the tubes into separate or discrete joints where provided, for robust construction of the frame at joints integrated with frame tubing, for reducing sharpness of bends of cables, and to enable cables to bypass joints which cannot be interrupted to accommodate cable passage, such as where seat posts and handle bar tubing must be robustly supported. These situations arise where power, signal, and illumination bearing cables are carried within the bicycle frame, and where the bicycle frame is provided with internal illumination intended to be visible from the exterior of the bicycle.

BRIEF DESCRIPTION OF THE DRAWINGS

Various objects, features, and attendant advantages of the present invention will become more fully appreciated as the same becomes better understood when considered in conjunction with the accompanying drawings, in which like reference characters designate the same or similar parts throughout the several views, and wherein:

FIG. 2 is a diagrammatic side cross section of a bicycle frame joint shown at the left of FIG. 1, according to at least one aspect of the disclosure;

FIG. 3 is a diagrammatic end perspective view of a bicycle frame joint, according to at least one aspect of the disclosure;

FIG. 4 is a diagrammatic end perspective view of a bicycle frame joint, according to at least one aspect of the disclosure;

FIG. 5 is a diagrammatic side view of FIG. 2;

FIG. 6 is a diagrammatic side cross section of a bicycle frame joint shown at the upper right of FIG. 1, according to at least one aspect of the disclosure;

FIG. 7 is a diagrammatic side view showing a perimeter of an assembled bicycle frame;

FIG. 8 is a diagrammatic side cross section of a bicycle frame joint shown at the bottom center of FIG. 1, according to still another aspect of the disclosure;

FIG. 9 is a diagrammatic top view of FIG. 8, shown partly in cross section;

FIG. 10 is a diagrammatic side cross section of a bicycle frame joint shown at the right of FIG. 1, according to a further aspect of the disclosure;

FIG. 11 is a diagrammatic cross section of a bicycle frame joint, according to still another aspect of the disclosure;

FIG. 12 is a diagrammatic cross section of a bicycle frame joint, according to yet another aspect of the disclosure;

FIG. 13 is a diagrammatic side view of a bicycle frame joint integrated with a frame tube, according to still another aspect of the disclosure;

DETAILED DESCRIPTION

Figure 1:
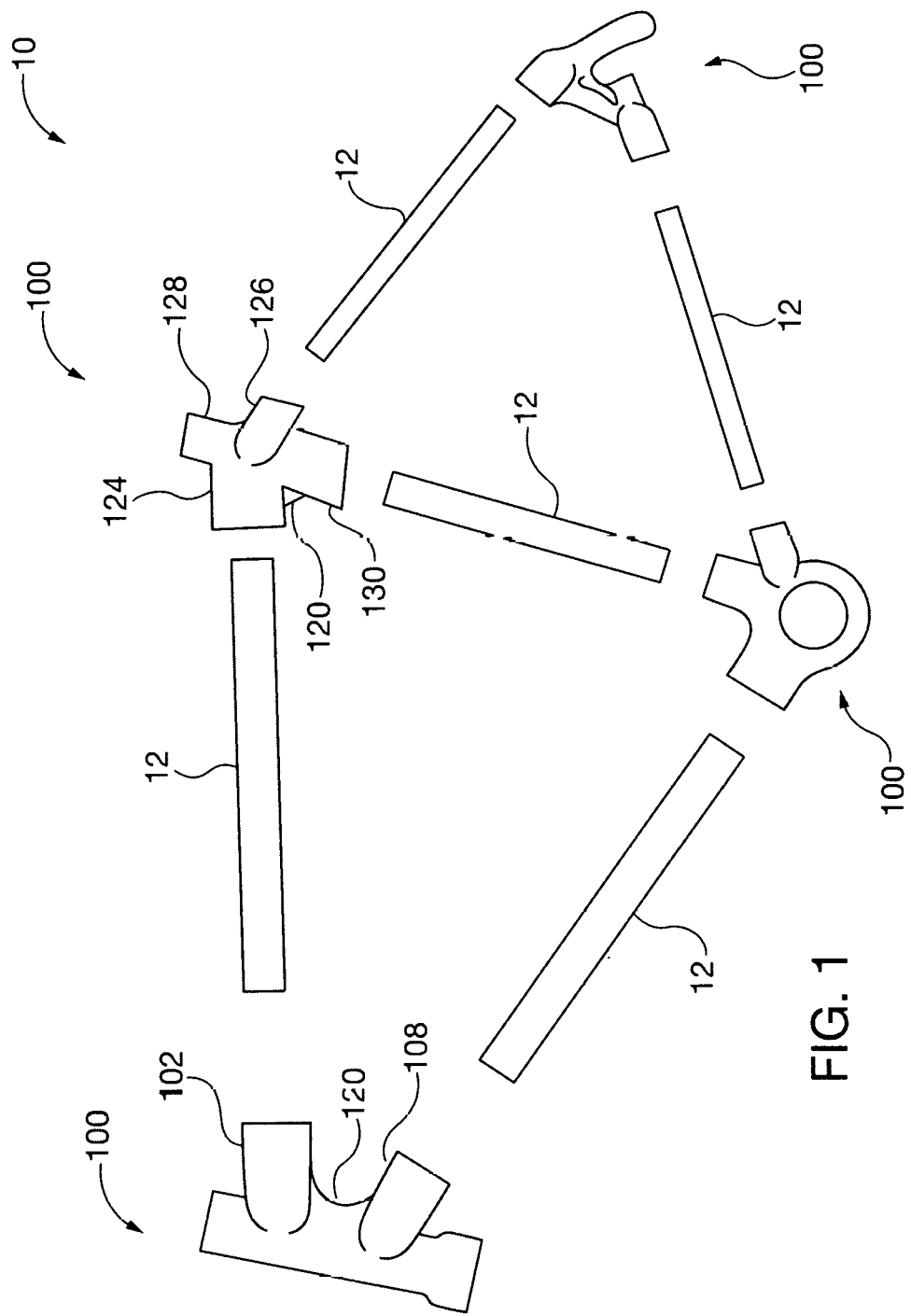
FIG. 1 is a diagrammatic exploded side view of a bicycle frame including a bicycle frame joint, according to at least one aspect of the disclosure.

Referring first to FIG. 1, there is shown a bicycle frame 10 of the type including tubes 12 to be anchored in frame joints (e.g., a frame joint IOU, shown in greater detail in FIG. 2). Tubes 12 will be understood to encompass seat stays and chain stays. Tubes 12 may be of a synthetic polymeric material, such as a polycarbonate for example. Tubes 12 are inserted into sockets (e.g., a socket 102, 108, 124, or 126) of frame joints and suitably secured by heat or ultrasonic welding, adhesive, or in any other suitable way.

A head tube joint 100 is shown in FIG. 2. Each one of the bicycle frame joints such as bicycle frame joint 100 comprises at least a first socket 102 for receiving a frame tube 12 of a bicycle (not shown in its entirety). First socket 102 has a first outer wall 104 surrounding a first open cavity 106, first open cavity 106 dimensioned and configured to receive frame tube 12. Each one of the bicycle frame joints comprises at least a second socket 108 for receiving another frame tube 12 of the bicycle. Second socket 108 has a second outer wall 110 surrounding a second open cavity 112 dimensioned and configured to receive the other frame tube 12. When viewed in an azimuth view (e.g., FIG. 2), A hypothetical extension of first cavity 106 at least partially intersects a hypothetical extension of second cavity 112. At least one auxiliary passage 114 is continuously open between first open cavity 106 and second open cavity 112. Auxiliary passage 114 has a maximum cross section smaller in area than an area of any cross sectional configuration of first open cavity 106 and of second open cavity 112. At least a portion of auxiliary passage lies outside bounds of first open cavity 106 and of second open cavity 112.

Longitudinal axes shown as projection lines 16, 118 represent hypothetical extensions of first and second open cavities 106, 112. Projection lines 116, 118 lie in a common plane and because they are not parallel, will eventually intersect one another. "Partially intersecting" contemplates that the open space of a socket, and not just a single dimensional line, could hypothetically be extended, and intersect another extended open space of a socket, with possible misalignment preventing true full intersection.

Auxiliary passage 114 may be irregularly configured, and hence may have many cross sections. The maximum of these cross sections is smaller in area than any cross sectional area of both first open cavity 106 and second open cavity 112. The term "any cross sectional area" contemplates all possible cross sections taken along the longitudinal axis (e.g., projection lines 116, 118) of either open cavity 106 or 112.

While some of auxiliary passages 114 may be said to be in common with the volume of either of first or second open cavities 106 or 112, at least a portion of auxiliary passage 114 is not in common with the volume of first or second open cavities 106, 112. That portion of auxiliary passage 114 not in common with first or second open cavities 106, 112 spans first and second open cavities 106, 112, and enables continuity of a cable 142 (to be further explained hereinafter).

As used herein, the phrase "at least" explicitly contemplates more than one of the recited article. Unless otherwise indicated, the terms "first", "second", etc., are used herein merely as labels, and are not intended to impose ordinal, positional, or hierarchical requirements on the items to which these terms refer. Moreover, reference to, e.g., a "second" item does not either require or preclude the existence of, e.g., a "first" or lower-numbered item, and/or, e.g., a "third" or higher-numbered item.

Bicycle frame joint 100 may further comprise a gusset 120 between first socket 102 and second socket 108. The at least one auxiliary passage 114 is enclosed within gusset 120. As a consequence, auxiliary passage 114 is enclosed along its entire length. Therefore, auxiliary passage 114 does not communicate to the exterior bicycle frame joint 100. Auxiliary passage 114 carries a cable 142 (see FIG. 3) therein, and protects cable 142 from the external environment of the associated bicycle. Because open cavity 106 of first socket 102 receives a frame tube 12, it is important to avoid causing an interference between cable 142 and frame tubes 12. Auxiliary passage(s) increase volume of open cavity 106, thereby accommodating both frame tubes 12 and also cable 142.

Cable 142 will be understood to include insulated and uninsulated electrical conductors, jacketed and unprotected optic fibers, filaments, and light pipes, flexible electrical assemblies such as lighting strips bearing lighting elements such as light emitting diodes (LEDs), flexible printed circuits, and other flexible objects and assemblies.

Cable 142 may comprise for example LED strip products available from a retailer such as Adafruit Industries, such as NeoPixel digital RGB LED strip, product identification 1461 (https://www.adafruit.com/products/1461). It should not be inferred from the drawings that LEDs can only be arranged in a single row. A series of LEDs may include more than one row of LEDs.

Each LED may be a three-part LED assembly including one red constituent LED, one green constituent LED, and one blue constituent LED. Electrical conductors (not separately shown) are connected to each red constituent LED of each three-art LED assembly, to each green constituent LED of each three-part LED assembly, and to each blue constituent LED of each three-part LED assembly, such that each lighting element is individually addressable by one of electrical conductors contained within and integral to cable 1242. Not only are lighting elements individually addressable, each of the red, green, and blue constituent LEDs of any one lighting element are individually addressable. This enables any one lighting element to be controlled as to color or hue, and on-and-off independently from other lighting elements.

Still referring to FIG. 2, first socket 1202 includes a stop 122 projecting into first open cavity 106. Penetration of a frame 12 inserted into first open cavity 122 is limited by interference with a stop 122. In the example of FIG. 2, stop 122 comprises a solid wall. However, stop 122 could comprise a member which leaves first open cavity 122 less than fully obstructed. This would be desirable where cable 142 passes from first socket 102 into another open element of the bicycle frame.

Figure 16:
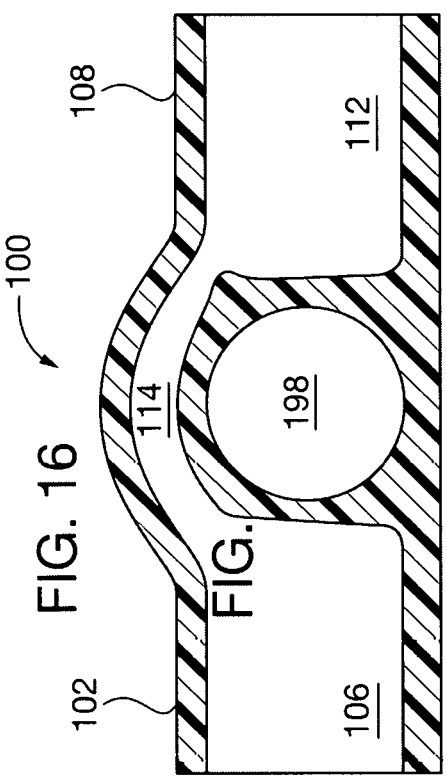
FIG. 16 is a diagrammatic side cross section of a bicycle frame joint, according to still another aspect of the disclosure.

Referring to FIGS. 1, 3, 4, 14, 15, and 16, an auxiliary passage 114 may be located along one or more sockets (e.g., sockets 124 and 126 in FIG. 1) as well as between two sockets (e.g., between first and second sockets 102, 108 by occupying gusset 102). This construction may be used where it is desired to have cable 142 bypass a first or second socket 124 or 126, or joint tube 128 or 130 without entering the bypassed socket 124 or 126 or joint tube 128 or 130. Referring particularly to FIG. 16, auxiliary passage 114 is open to first socket 102 and to second socket 108, is continuous between first socket 102 and second socket 108, and bypasses at least one tube receiving passageway 198 of bicycle frame joint 100 between first socket 102 and second socket 108. Alternatively stated, where there is an intervening passageway (e.g., tube receiving passageway 198) intended to receive an inserted item such as a frame tube 12, a seat post (not shown), or a handlebar stem (not shown), where it is desired to route cable 142 past the intervening passageway, auxiliary passage 114 connects those sockets 102, 108 intended to receive cable 142 while bypassing the unintended intervening passageway 198.

Figure 15:
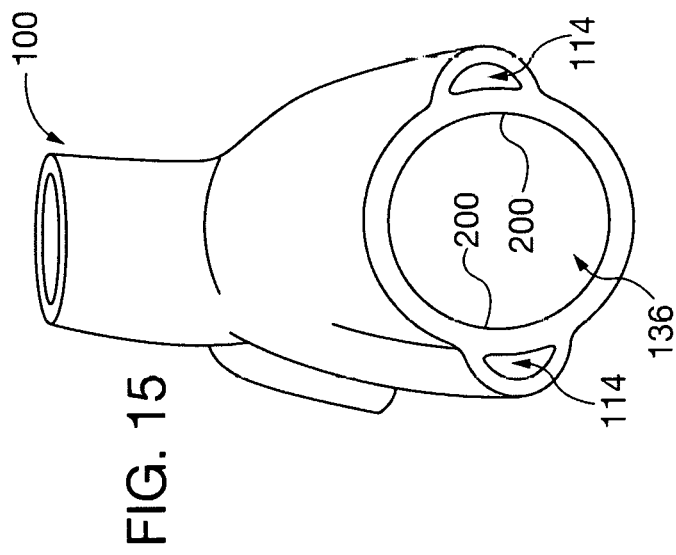
FIG. 15 is a diagrammatic end perspective view of a bicycle frame joint, according to yet a further aspect of the disclosure.
Figure 14:
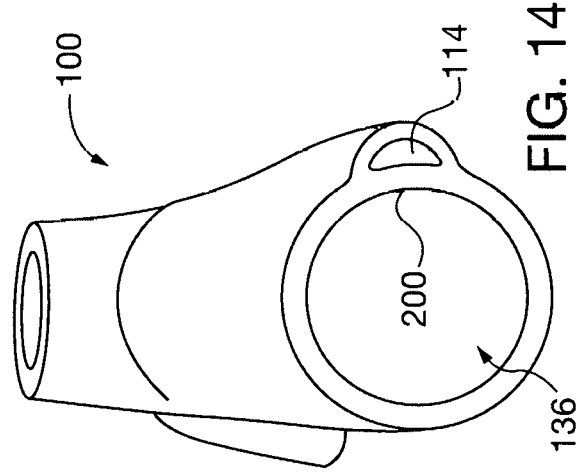
FIG. 14 is a diagrammatic end perspective view of a bicycle frame joint, according to a further aspect of the disclosure.

In the example of FIG. 3, there is no wall separating auxiliary passage 114 and the open cavity (e.g., open cavity 106). Yet auxiliary passage 114 adds to the volume of open cavity 106, and does not merely co-occupy the volume of open cavity 106. The difference between a socket 124 or 126, and a joint tube 128 or 130 is that whereas sockets include a stop 122 to limit penetration by a frame tube 12, joint tubes 128, 130 lack a stop, to enable full penetration such as by a seat post (not shown) or a frame tube 12. In FIG. 3, there is one auxiliary passage 114. In FIG. 4, there are two opposed auxiliary passages 114. In FIGS. 3 and 4, auxiliary passage 114 is demarcated from an open cavity 136 by an imaginary broken line 134. FIG. 4 is similar to FIG. 3, but illustrates two auxiliary passages 114, one on either side of open cavity 106 of first socket 102. FIG. 14 corresponds to FIG. 3, but shows an intervening wall 200 separating open cavity 136 from auxiliary passage 114. FIG. 15 corresponds to FIG. 4, but shows two intervening walls 200 separating open cavity 136 from both of two auxiliary passages 114.

Turning to FIG. 5, in a head tube bicycle frame joint 100, auxiliary passage 114 is open to and parallel to both first socket 106 and to second socket 108 along at least part of a length of auxiliary passage 114. That portion of auxiliary passage 114 open and parallel to first socket 102 is designated 138; that portion of auxiliary passage 114 open and parallel to second socket 108 is designated 140. This arrangement enables a tube 112 inserted into first and second sockets 102, 108 to pass cable 142 by a hole (not shown) located away from a terminal of tube 112, thereby preserving structural integrity of the terminal of tube 112.

Turning now to FIG. 6, first socket 102 has a first longitudinal axis 116, second socket has a second longitudinal axis 118, and first longitudinal axis 116 and second longitudinal axis 118 occupy a common plane and converge at a convergence point 144 within a perimeter 146 (see FIG. 7) of a bicycle frame (e.g., that shown in FIG. 1) associated with bicycle frame joint 100. Location of convergence point 144 within perimeter 146 is illustrated in FIG. 7, wherein perimeter 146 is that taken when the associated bicycle frame is viewed from the side.

Referring again to FIG. 2, bicycle frame joint 100 may further comprise a socket tube 148 having a length and a third open cavity 150 open continuously along the length of socket tube 148, wherein first socket 102 joins socket tube 148 at a first intersection 152 and a second socket 108 joins socket tube 148 at a second intersection 154 spaced apart from first intersection 152, whereby bicycle frame joint 100 is a head tube joint. A socket tube (e.g., socket tube 148) may be distinguished from a socket (e.g., first socket 102) by not having structure obstructing continuity of its open center (e.g., third open cavity 150) along the length of the socket tube. By contrast, a socket has stop 122 or other structure obstructing or terminating an open cavity (e.g., open cavity 106) associated with the socket. Length of socket tube 148 is along central axis 156.

Turning now to FIG. 6, bicycle frame joint 100 may further comprise a socket tube (seen as joint tubes 128 and 130 collectively) having a length and a third open cavity 150 continuously along the length of the socket tube, wherein first socket 102 joins the socket tube at first intersection 152 on one side of the socket tube, and second socket 108 is on an opposed side of the socket tube. Second socket 108 is one of two second sockets 108 on the opposed side of the socket tube. The two second sockets 108 are dimensioned and configured to receive a seat stay tube therein, whereby bicycle frame joint 100 is a seat tube joint. The seat tube joint passes a seat post (not shown) therethrough, and accepts insertion of frame tubes 12 corresponding to a top tube and seat stays.

Turning now to FIGS. 8 and 9, bicycle frame joint 100 includes first socket 102 including first open cavity 106 and second socket 108 including second open cavity 112. Additionally, bicycle frame joint 100 further comprises a bottom bracket 158 having a passage 160 and a bottom bracket axis 162 centered within passage 160, a third socket 164 having a third open cavity 166, and a fourth socket 168 having a fourth open cavity 170. First socket 102 joins bottom bracket 158 at a first intersection 152, and second socket 108 joins bottom bracket 158 at a second intersection 154. Third socket 164 and fourth socket 168 join bottom bracket 158 at an acute angle 172 to second socket 108, and are axially offset from one another along bottom bracket axis 162, whereby bicycle frame joint 100 is a bottom bracket joint.

Referring now to FIG. 10, a bicycle frame joint 100 includes first socket 112 and second socket 108. Bicycle frame joint further comprises a dropout 174 comprising a plate 176 including a slot 178, wherein first socket 102 joins dropout 174 at passage 114, and second socket 108 joins dropout 174 at an acute angle 172 to first socket 102, whereby bicycle frame joint is a chain stay and seat stay joint. In bicycle frame joint 100 of FIG. 10, first and second sockets 102, 108 have respective stops 122 located within respective terminals 180, 182.

Bicycle frame joints 100 may be made from metal or alternatively, form other materials and combinations of materials. For example, in one implementation, bicycle frame joint is at least partially made from a synthetic resin or polymer. This synthetic resin or polymer may be transparent or translucent, whereby bicycle frame joint 100 is at least partially light transmissive. Bicycle frame joint 100 may comprise fiber reinforcement within the synthetic resin. For example, fiberglass fibers, carbon fibers, and fibers of other synthetic materials may be blended into the constituent material of bicycle frame joint 100.

The constituent material of bicycle frame joint 100 may be a polycarbonate plastic, for example. Poly carbonate is one of a number of constituent materials which may be utilized to form bicycle frame joint 100. Other materials which may be substituted include other opaque, transparent or translucent plastics, such as acrylic, acrylonitrile butadiene styrene, and others. Polycarbonate is readily commercially available, light in weight, readily extruded, and strong enough to serve as a suitable material for bicycle frame joint 100. Synthetic materials such as polycarbonate may optionally be reinforced with carbon fiber, fiberglass, and other materials. Poly carbonate may be coated or impregnated with a material resistant to ultraviolet light. Bicycle frame joints 100 may be made by injection molding, by three dimensional printing, or in any other suitable way.

Referring again to FIG. 3, in one implementation, bicycle frame joint 100 further comprises cable 142 in auxiliary passage 114. O course, more than one cable 142 may be present. In an implementation of bicycle frame joint 100, cable 142 fits loosely within auxiliary passage 114. This enables installation of cable 142 by for example, fishing cable 142 through open cavities (e.g., open cavity 106) of sockets, through hollow centers (not shown) of tubes 12, and through auxiliary passages 114.

Referring also to FIG. 11, cable 142 is embedded in auxiliary passage 114. In this example, auxiliary passage 114 is entirely occupied by cable 142, and therefore is not visible unto itself. As seen in FIG. 12, cable 142 occupies a portion of auxiliary passage 114, so that open portion 184 of auxiliary passage 114 is visible in the cross section of FIG. 12. A fully embedded cable 142 enables a circuit made up using cable 142 to be provided in segments, so that fishing cable 142 though an objectionably long or tortuous route is not necessary. The desired circuit could be completed by joining several segments in series, with one segment permanently a part of a bicycle joint 100 by virtue of being embedded therein.

In FIG. 12, cable 142 includes light emitting sources 186.

Bicycle frame joints 100 described thus far are intended for use in assembling a complete bicycle frame by inserting frame tubes 12 thereinto, and preferably, bonding the frame tubes 12 in place. It would be possible to integrate a bicycle frame joint 100 with a frame tube 12 to arrive at a module useful in assembling the same complete bicycle frame which could otherwise be assembled from separate bicycle frame joints and frame tubes 12. Therefore, as illustrated in FIG. 3, but also referring to FIGS. 1-12, the present disclosure contemplates a bicycle frame joint 100 comprising at least one first socket 102 for receiving frame tube 12 of a bicycle, first socket 102 having a first outer wall 104 surrounding first open cavity 106, first open cavity 106 dimensioned and configured to receive frame tube 12, at least one frame tube 12 (as shown in FIG. 13) of the bicycle, frame tube 12 having a second outer wall 118 surrounding a second open cavity 190, wherein, in a view such as that of FIG. 13, a hypothetical extension 192 of first open cavity 106 at least partially intersects a hypothetical extension 194 of second open cavity 190. At least one auxiliary passage 114 (see FIG. 8) is in communication with first open cavity 106 and second open cavity 112, auxiliary passage 114 having a wall 196 (FIG. 8) enclosing an open internal volume outside first open cavity 106 and second open cavity 112. The open internal volume outside or exclusive of first and second open cavities 106, 112 is the open passageway provided by auxiliary passage 114. This may be more apparent in FIG. 2, where auxiliary passage 114 is greater in extent than in FIG. 8.

In FIG. 13, bicycle frame joint 100 integrated with frame tube 12 is a bottom bracket joint. Corresponding integration of a bicycle frame joint 100 with a frame tube 12 could be performed with head tube joints, seat tube joints, and chain stay and seat stay joints. Similarly bicycle frame joints may incorporate more than one frame tube 12, more than one bicycle frame joint 100, and both more than one bicycle frame joint 100, and more than one frame tube 12.

While the present invention has been described in connection with what is considered the most practical and preferred embodiment, it is to be understood that the present invention is not to be limited to the disclosed arrangements, but is intended to cover various arrangements which are included within the spirit and scope of the broadest possible interpretation of the appended claims so as to encompass all modifications and equivalent arrangements which are possible.

It should be understood that the various examples of the apparatus(es) disclosed herein may include any of the components, features, and functionalities of any of the other examples of the apparatus(es) disclosed herein in any feasible combination, and all of such possibilities are intended to be within the spirit and scope of the present disclosure. Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples presented and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims.

I claim:

1. A bicycle frame joint comprising:
   at least a first socket for receiving a frame tube of a bicycle, the first socket having a first outer wall surrounding a first open cavity, the first open cavity dimensioned and configured to receive the frame tube;
   at least a second socket for receiving another frame tube of the bicycle, the second socket having a second outer wall surrounding a second open cavity, the second open cavity dimensioned and configured to receive the other frame tube, wherein, when viewed in an azimuth view, a hypothetical extension of the first cavity at least partially intersects a hypothetical extension of the second cavity; and
   at least one auxiliary passage continuously open between the first open cavity and the second open cavity, the auxiliary passage having
      a maximum cross section smaller in area than an area of any cross sectional configuration of the first open cavity and of the second open cavity, and wherein
      at least a portion of the auxiliary passage lies outside bounds of the first open cavity and of the second open cavity.

2. The bicycle frame joint of claim 1, further comprising a gusset between the first socket and the second socket, wherein the at least one auxiliary passage is enclosed within the gusset.

3. The bicycle frame joint of claim 1, wherein the auxiliary passage is enclosed along the entire length of the auxiliary passage.

4. The bicycle frame joint of claim 1, wherein the first socket includes a stop projecting into the first open cavity, whereby penetration of a frame tube inserted into the first open cavity is limited by interference with the stop.

5. The bicycle frame joint of claim 1, wherein the auxiliary passage is open to a first socket and a second socket, is continuous between the first socket and the second socket, and bypasses at least one tube receiving passageway of the bicycle frame joint between the first socket and the second socket.

6. The bicycle frame joint of claim 1, wherein the auxiliary passage is open to and parallel to both the first socket and the second socket along at least part of a length of the auxiliary passage.

7. The bicycle frame joint of claim 1, wherein the first socket has a first longitudinal axis, the second socket has a second longitudinal axis, and the first longitudinal axis and the second longitudinal axis occupy a common plane and converge at a convergence point within a perimeter of a bicycle frame associated with the bicycle frame joint.

8. The bicycle frame joint of claim 1, further comprising a socket tube having a length and a third open cavity open continuously along the length of the socket tube, wherein the first socket joins the socket tube at a first intersection and the second socket joins the socket tube at a second intersection spaced apart from the first intersection, whereby the bicycle frame joint is a head tube joint.

9. The bicycle frame joint of claim 1, further comprising a socket tube having a length and a third open cavity continuously along the length of the socket tube, wherein the first socket joins the socket tube at a first intersection on one side of the socket tube and the second socket is on an opposed side of the socket tube, and the second socket is one of two second sockets on the opposed side of the socket tube, and the two second sockets are dimensioned and configured to receive a seat stay tube therein, whereby the bicycle frame joint is a seat tube joint.

10. The bicycle frame joint of claim 1, further comprising a bottom bracket having a passage and a bottom bracket axis centered within the passage, a third socket having a third open cavity, and a fourth socket having a fourth open cavity, wherein the first socket joins the bottom bracket at a first intersection, the second socket joins the bottom bracket at a second intersection, and the third socket and the fourth socket join the bottom bracket at an acute angle to the second socket, and are axially offset from one another along the bottom bracket axis, whereby the bicycle frame joint is a bottom bracket joint.

11. The bicycle frame joint of claim 1, further comprising a dropout comprising a plate including a slot, wherein the first socket joins the dropout at a first intersection, and the second socket joins the dropout at an acute angle to the first socket, whereby the bicycle frame joint is a chain stay and seat stay joint.

12. The bicycle frame joint of claim 1, wherein the bicycle frame joint is at least partially made from a synthetic resin.

13. The bicycle frame joint of claim 12, wherein the bicycle frame joint is at least partially light transmissive.

14. The bicycle frame joint of claim 12, further comprising fiber reinforcement within the synthetic resin.

15. The bicycle frame joint of claim 1, further comprising a cable in the auxiliary passage.

16. The bicycle frame joint of claim 15, wherein the cable fits loosely within the auxiliary passage.

17. The bicycle frame joint of claim 15, wherein the cable is embedded in the auxiliary passage.

18. The bicycle frame joint of claim 15, wherein the cable includes light emitting sources.

19. A bicycle frame joint comprising:
   at least one first socket for receiving a frame tube of a bicycle, the first socket having a first outer wall surrounding a first open cavity, the first open cavity dimensioned and configured to receive the frame tube;
   at least one frame tube of the bicycle, the frame tube having a second outer wall surrounding a second open cavity, the second open cavity wherein when viewed in an azimuth view, a hypothetical extension of the first cavity at least partially intersects a hypothetical extension of the second cavity; and
   at least one auxiliary passage in communication with the first open cavity and the second open cavity, the auxiliary passage having a wall enclosing an open internal volume outside the first open cavity and the second open cavity.

20. The bicycle frame joint of claim 19, further comprising a gusset between the first socket and the frame tube, wherein the at least one auxiliary passage is enclosed within the gusset.

\* \* \* \* \*